Sept. 1, 1959 R. K. BERKY 2,901,899
SLIP CLUTCH
Filed April 24, 1958

INVENTOR
RICHARD K. BERKY
BY Joseph Allen Brown
ATTORNEY

United States Patent Office 2,901,899
Patented Sept. 1, 1959

2,901,899

SLIP CLUTCH

Richard K. Berky, Grabill, Ind., assignor to Sperry Rand Corporation, New Holland, Pa., a corporation of Delaware Application April 24, 1958, Serial No. 730,573

6 Claims. (Cl. 64—30)

The present invention relates generally to clutches and more particularly to an improved slip clutch.

One object of this invention is to provide a slip clutch structure which has few parts of simple design and low cost, and capable of easy assembly and disassembly.

Another object of this invention is to provide a slip clutch, the clutching characteristics of which can be easily and quickly varied.

Other objects of this invention will be apparent hereinafter from the specification and from the recital in the appended claims.

Figure 1:
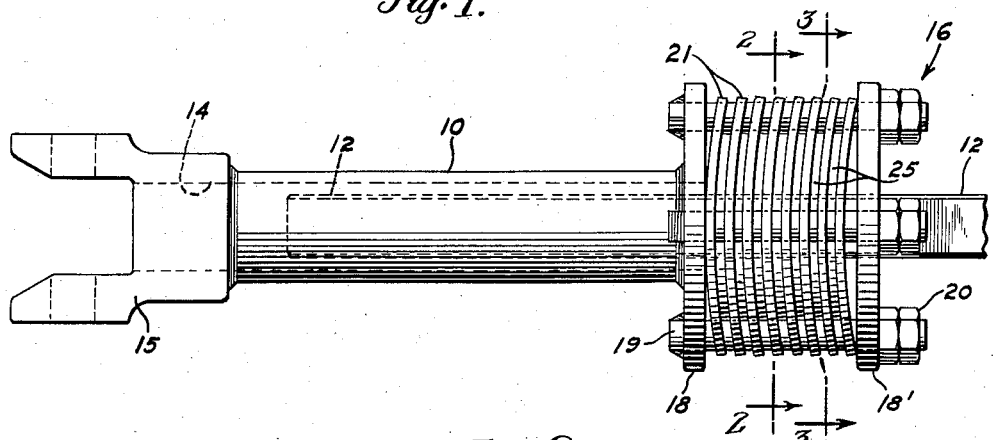
Fig. 1 is a side elevation showing a drive and a driven shaft coupled by a slip clutch constructed according to this invention.
Figure 2:
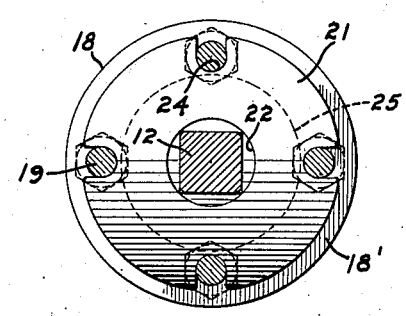
Fig. 2 is a section taken on the line 2—2 of Fig. 1 and looking in the direction of the arrows.
Figure 3:
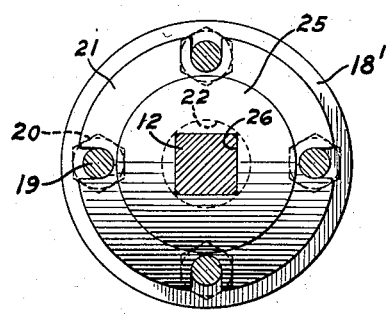
Fig. 3 is a section taken on the line 3—3 of Fig. 1 and looking in the direction of the arrows.

Referring now to the drawing by numerals of reference, 10 denotes a tubular drive shaft and 12 a driven shaft, the respective shafts being telescopically disposed. Driven shaft 12 is square in cross section. The size of shaft 12 is such relative to the diameter of the bore 14 of drive shaft 10 that the respective shafts would be relatively rotatable in the absence of a coupling means.

One end of drive shaft 10 carries a yoke 15 of a universal joint adapted to be connected to a source of power, not shown, such as the power plant of a tractor. Driven shaft 12 is connectable to a mechanism to be driven, not shown, such as an agricultural implement. The end of drive shaft 10 opposite the yoke 15 has an axially projecting cage 16 connected to it. Cage 16 comprises a pair of axially spaced washers 18 and 18' interconnected by four bolts 19 disposed in angularly spaced relationship, 90° apart. Nuts 20 are threaded on the respective bolts, as shown. Washer 18 is welded or otherwise affixed to the drive shaft 10. The washer 18' is movable toward or away from the washer 18 upon adjustment of the nuts 20.

Carried on cage 16 are drive plates 21 in the form of washers each of which has a bore 22 through which driven shaft 12 projects. Each drive plate has four notches 24 in its periphery through which the bolts 19 pass.

Slid onto driven shaft 12 and interleaved between drive plates 21 are driven plates 25 each of which has a square opening adapted to snugly receive the driven shaft. Since driven shaft 12 is square and the driven plates 25 have a square central opening, when driven plates 25 are rotated the driven shaft is likewise rotated. The diameter of driven plates 25 is such that they fit within the bolts 19 without coming into peripheral engagement with the bolts. Further, because of the cylindrical bores 22 of drive plates 21, the drive plates may be rotated without directly driving shaft 12.

Plates 21 and 25 are disposed in abutting relationship. They are made of hardened spring steel and are normally bowed so that when viewed from the side as shown in Fig. 1 they are generally U-shaped. All plates are bowed in the same direction and in the same plane, such plane being perpendicular to the coaxial axes of rotation of the drive and driven shafts. All of the plates are resilient whereby they are bendable to eliminate the bowing when subjected to a force exceeding a predetermined amount.

In operation, when power is transmitted to the drive shaft 10, it is rotated. Shaft 10 in turn rotates the cage 16, and the drive plates 21 thereon. Since the drive and driven plates are in axial abutting relationship, and since the drive and driven plates are bowed in one plane, the drive plates transmit force to the driven plates thereby rotating the driven shaft 12. However, when the driven shaft is subjected to a rotating resisting force exceeding a predetermined amount, the driven plates resist rotation, and the drive and driven plates flatten out. In other words, the bowing is eliminated whereby the respective plates are freed of each other and may rotate relative to each other. As long as the plates are bowed, the drive plates transmit force to the driven plates. However, when they flatten out because of a resisting force exceeding the amount necessary to bend the plates against the resistance of their own resiliency, the plates become flat and the transmission of power ceases. In such case, the drive plates continue to rotate while the driven plates remain stationary. As soon as the overload force is relieved, the plates 21 and 25 return to their normal bowed position and are again in driving coupled relationship.

It will be apparent that the number of drive and driven plates employed in the clutch device may be varied at will. In this way, the clutching characteristics of the device may be readily varied. The drive plates 21 are mounted in cage 16 merely by removal of the nuts 20 and washer 18'. Likewise, any number of driven plates may be slid onto the driven shaft 12 and interleaved between the drive plates 21.

While this invention has been described in connection with a particular embodiment thereof, it will be understood that it is capable of further modification and other uses, and this application is intended to cover any variations, uses, or adaptations of the invention following, in general, the principles of the invention and including such departure from the present disclosure as come within known or customary practice in the art to which the invention pertains, and as fall within the scope of the invention or the limits of the appended claims.

Having thus described my invention what I claim is:

1. A slip clutch comprising a drive plate and a driven plate rotatable on a common axis, both plates being normally bowed in the same direction and in a plane perpendicular to said axis, said plates being disposed in axial abutting relation with the bowed portions normally in register, and one plate, at least, being resilient.

2. A slip clutch for connecting a drive and a driven shaft comprising a drive plate affixed to said drive shaft, a driven plate affixed to said driven shaft, said plates being rotatable on a common axis and both being normally bowed in the same direction and in a plane perpendicular to said axis, said plates being disposed in axial abutting relation with the bowed portions normally in register whereby when said drive plate is rotated said driven plate is rotated, and one plate at least being resilient whereby when said driven shaft is subjected to a rotation resisting force exceeding a predetermined amount the bowing in said one plate is eliminated and the drive plate is rotatable relative to the driven plate.

3. A slip clutch for connecting a drive and a driven shaft comprising a plurality of resilient drive plates affixed to said drive shaft, a plurality of resilient driven plates affixed to said driven shaft and interleaved between the respective drive plates, said drive and driven plates being rotatable on a common axis and all being normally bowed in the same direction and in a plane perpendicular to said axis, said plates abutting one against the other with the bowed portions normally in register whereby when the drive plates are rotated the driven plates are rotated, all of said plates being adapted to be distorted to eliminate the bowing and permit the drive plates to rotate relative to the driven plates when the driven shaft is subjected to a rotation resisting force exceeding a predetermined amount.

4. A tubular drive shaft having a bore of a given diameter, a coaxial driven shaft projecting into said bore, said driven shaft being of a size less than said given diameter whereby said shafts may be relatively rotated, and a slip clutch for connecting said shafts comprising a resilient drive plate surrounding said driven shaft, means affixing said drive plate to said drive shaft, a resilient driven plate affixed to said driven shaft and disposed in abutting relation with said drive plate, and both of said plates being normally bowed in the same direction and in a plane perpendicular to the axes of rotation of said shafts.

5. A tubular drive shaft having a bore of a given diameter, a coaxial driven shaft projecting into said drive shaft, said driven shaft being of a size less than said given diameter whereby said shafts may be relatively rotated, and a slip clutch for connecting said shafts comprising a cage connected to one end of said drive shaft and extending axially therefrom and around said driven shaft, a drive plate affixed to said cage and surrounding said driven shaft, a driven plate affixed to said driven shaft and disposed in abutting relation with said drive plate, both of said plates being normally bowed in the same direction and in a plane perpendicular to the axes of rotation of said shafts, and both of said plates being resilient whereby when said driven shaft is subjected to a rotating resisting force exceeding a predetermined amount the bowing in the plates is eliminated and the drive plate is rotatable relative to the driven plate.

6. A tubular drive shaft having a bore of a given diameter, a coaxial driven shaft projecting into said drive shaft, said driven shaft being of a size less than the diameter of the drive shaft bore whereby the shafts may be relatively rotated, and a slip clutch for connecting said shafts comprising a cage connected to one end of said drive shaft and extending axially therefrom and around said driven shaft, a plurality of drive plates carried on said cage and surrounding said driven shaft, said drive plates being fixed against rotation relative to said drive shaft and being axially shiftable relative thereto, a plurality of driven plates carried on said driven shaft and interleaved between the respective drive plates, said driven plates being fixed against rotation relative to said driven shaft and being axially shiftable relative thereto, said drive and driven plates abutting against each other and being normally bowed in the same direction and in a plane perpendicular to the axes of rotation of said shafts, and said plates being resilient whereby when the driven shaft is subjected to a rotating resisting force exceeding a predetermined amount the bowing of the plates is eliminated and the drive plates are rotatable relative to the driven plates.

References Cited in the file of this patent
UNITED STATES PATENTS

| | | |
|---|---|---|
| 442,469 | Weston | Dec. 9, 1890 |
| 2,218,754 | Jones | Oct. 22, 1940 |
| 2,759,759 | Blackwood | Aug. 21, 1956 |

FOREIGN PATENTS

| | | |
|---|---|---|
| 932,194 | France | Nov. 17, 1947 |